(No Model.)
H. C. BERRY.
DEVICE FOR LEVELING BILLIARD TABLES.
No. 399,126. Patented Mar. 5, 1889.
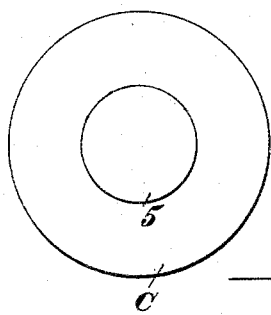
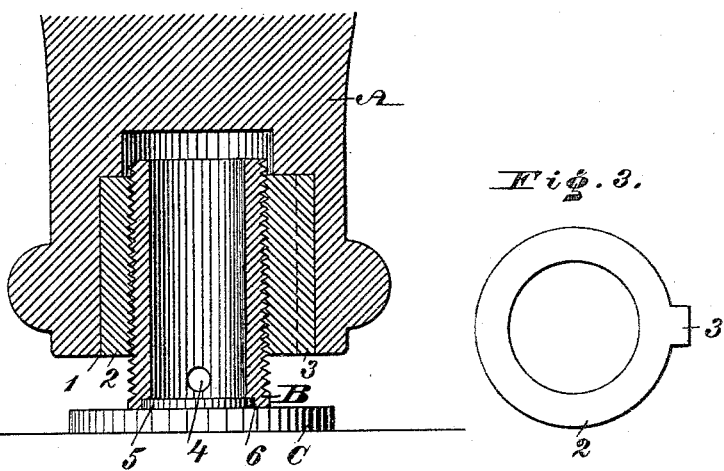
Witnesses
Theo. Rollé.
A. P. Jennings.
Inventor,
Henry C. Berry
By his Attorneys
Diedersheim & Kintner

UNITED STATES PATENT OFFICE.

HENRY C. BERRY, OF PHILADELPHIA, PENNSYLVANIA.

DEVICE FOR LEVELING BILLIARD-TABLES.

SPECIFICATION forming part of Letters Patent No. 399,126, dated March 5, 1889.

Application filed August 7, 1888. Serial No. 282,124. (No model.)

*To all whom it may concern:*

Be it known that I, HENRY C. BERRY, a citizen of the United States, residing in the city and county of Philadelphia, State of Pennsylvania, have invented Devices for Leveling Billiard and other Game Tables, which improvement is fully set forth in the following specification and accompanying drawings.

My invention relates to devices for leveling billiard and other tables; and it consists in the mechanism herein described and claimed, and which is employed in connection with the legs of said tables, as herein set forth.

Figure 1 represents a vertical section of a table-leveling device embodying my invention. Fig. 2 represents a top view of the base of the device. Fig. 3 represents a bottom plan of the bushing employed.

Similar letters and numerals of reference indicate corresponding parts in the several figures.

Referring to the drawings, A represents a portion of a leg of a billiard or other game table. In the bottom of the leg is a vertical opening, 1, in which is fitted a stationary nut or bushing, 2, on the side of which is a vertical shoulder, 3, which enters a groove or recess in the side wall of the opening of the leg, whereby the bushing is prevented from rotation. The inner periphery of the bushing is screw-threaded, and to the same is fitted a screw-stem, B, which, as is evident, is capable of vertical motions. In the lower portion of the stem is an opening, 4, for the engagement of a spanner, wrench, or other tool whereby the stem may be rotated, so that the leg may be raised and lowered as may be required, and thus, as the several legs of the table are furnished with bushings and stems, as described, provision is made for conveniently and correctly adjusting or leveling the bed of the table, so that it sets true for purposes of the game. The screw-stem rests on a base, C, which is placed on the floor of the room, and has on its upper face a shoulder, 5, which enters a recess in the bottom edge of the stem.

During the operation of adjusting the table the screw rotates on the bed, and as the wall of the recess 6 encircles the shoulder 5 the stem during rotation is prevented from creeping on the base, whereby lateral motion of the legs is also prevented, and thus the table retains its location on the floor.

I am aware that it is not new in devices for leveling billiard and other tables to insert in recesses of the legs of the same screws, whereby, when turned, the legs are either raised or lowered; but I am not aware that the specific construction herein set forth is old, wherein the bushing has a vertical flange preventing its turning in the recess of the leg and where the base-plate has a shoulder on its upper face on which the screw-stem works.

Having thus described my invention, what I claim as new, and desire to secure by Letters Patent, is—

A table-leveling device consisting of an interiorly-threaded bushing with vertical shoulder on the side thereof, a base-plate with shoulder on its upper face, and a screw-threaded stem having a recess on its lower edge and side openings, the latter for insertion of handles, said parts being combined substantially as described.

HENRY C. BERRY.

Witnesses:
JOHN A. WIEDERSHEIM,
JAMES F. KELLY.